United States Patent
Gee et al.

(10) Patent No.: US 7,505,999 B2
(45) Date of Patent: Mar. 17, 2009

(54) AUTOMATED BUSINESS CORRESPONDENCE

(75) Inventors: Karen A. Gee, Heidelberg (DE); Tobias Haug, Heidelberg (DE); Roman Rura, Mannheim (DE); Dieter Schwarz, Reinheim (DE)

(73) Assignee: SAP AG, Walldorf (DE)

(*) Notice: Subject to any disclaimer, the term of this patent is extended or adjusted under 35 U.S.C. 154(b) by 497 days.

(21) Appl. No.: 11/047,989

(22) Filed: Jan. 31, 2005

(65) Prior Publication Data

US 2006/0020592 A1    Jan. 26, 2006

(51) Int. Cl.
G06F 7/00    (2006.01)
G06F 17/30   (2006.01)

(52) U.S. Cl. ............... 707/104.1; 707/4; 715/212
(58) Field of Classification Search ............ None
See application file for complete search history.

(56) References Cited

U.S. PATENT DOCUMENTS

| | | | | |
|---|---|---|---|---|
| 5,241,464 A * | 8/1993 | Greulich et al. | ............... | 705/26 |
| 5,490,217 A * | 2/1996 | Wang et al. | ............... | 380/51 |
| 5,682,524 A * | 10/1997 | Freund et al. | ............... | 711/5 |
| 5,848,426 A * | 12/1998 | Wang et al. | ............... | 715/505 |
| 2001/0056383 A1* | 12/2001 | Shuster | ............... | 705/27 |
| 2002/0143521 A1* | 10/2002 | Call | ............... | 704/1 |
| 2003/0065539 A1* | 4/2003 | Kay | ............... | 705/4 |
| 2004/0205508 A1* | 10/2004 | Wecker et al. | ............... | 715/501.1 |

* cited by examiner

*Primary Examiner*—Hosain T Alam
*Assistant Examiner*—Azam Cheema
(74) *Attorney, Agent, or Firm*—Kenyon & Kenyon LLP

(57) ABSTRACT

Automated generation of business correspondences includes accessing a template to retrieve a business form. The business form is encoded within a word processing application encoded, but also includes encoding for the dynamic generation of one or more fields consistent with formatting that is predefined in a template. Through the retrieval and filtering of business information, the business form includes dynamically generated business information data fields consistent with the filtered business information. The business information populates the appropriate fields in the business form, maintaining the proper formatting, including stylistic and table designations, because of the database formatting of the fields. As such, the business correspondences may be automatically generated with proper and consistent business information formatting. Meta data associated with the data fields in the template may be also used for other programming operations.

16 Claims, 4 Drawing Sheets

AUTOMATED BUSINESS CORRESPONDENCE

BACKGROUND

The present invention relates generally to the area of software and more specifically to generating automated business correspondences.

A major benefit of software applications is the reduction in time spent generating form documents. When a form document, such as a billing statement, is generated on a regular basis, it is extremely inefficient for a user to create and prepare all of the individual letters. Using a standard format, such as a form letter, and inserting data into designated form fields greatly reduces overhead costs associated with form documents and also increases user productivity.

Existing systems allow for the generation of form letters through the creation of a form letter template in a word processing environment. Within the word processing environment, typically a word processing software application, the form letter is then stored in an accessible directory. The word processing application retrieves and displays a selected form. Using internal coding, data entry fields may then be populated.

In one approach, a user is prompted with queues for entry of the missing data, such as a pop-up screen asking for a particular field of information, e.g., the address of the intended recipient. In another approach, the missing data may be retrieved from a business information database. In the example of an invoice, the database may include contact information and sales information.

Existing applications allow for the retrieval of this information and the insertion of this information within the form using a search and replace application program interface (API). Under the search and replace API, the data fields are replaced with the data from the database. Using the API approach using static pre-defined fields inserted in the form documents. These fields can not be adjusted in the event the formatting of the incoming information varies.

For example, the template may contain a pre-defined table have 3 columns and 10 rows. The API function searches and replaces data for all 30 fields, but if the original data contained 4 columns, all data from the fourth column would not be included in the letter.

In one example, the API searches for predefined terms associated with the fields. When the form document is created, the fields are given these designations within a template letter for use by the API. When doing the search and replace function, the API does not maintain the text formatting provided in the template. Therefore, not only does the API omit data outside of the predefined fields, it loses all textual formatting.

The data stored in the database, or spreadsheet, is acquired using a database software application. The data is formatted for the database software application and this formatting is inconsistent with the word processing application. More specifically, the search and replace API fails to translate the data from the database format to consistent formats usable by the word processor, and formats which have been defined in the letter template.

Therefore, form documents contain un-formatted database acquired data. For example, the contact information loses any font formatting and tables lose all tabular formatting. It is inefficient to then require a user to reformat the information. This prevents the production of multiple form documents, such as mass mailings. It also is extremely counterproductive to formatting benefits of the data, such as tabular data. For example, with a billing letter, a table may be used to indicate an account history or itemize an invoice. The tabular format is the most efficient application of this type of data and the format is used for storage within the database. The benefits of the database and tabular format are then lost when applied to form documents. Similarly, benefits may be lost regarding font specific formatting.

As such, there exists a need for generating automated business correspondences using database-formatted data in conjunction with word processor-formatted document templates.

DETAILED DESCRIPTION

Figure 1:
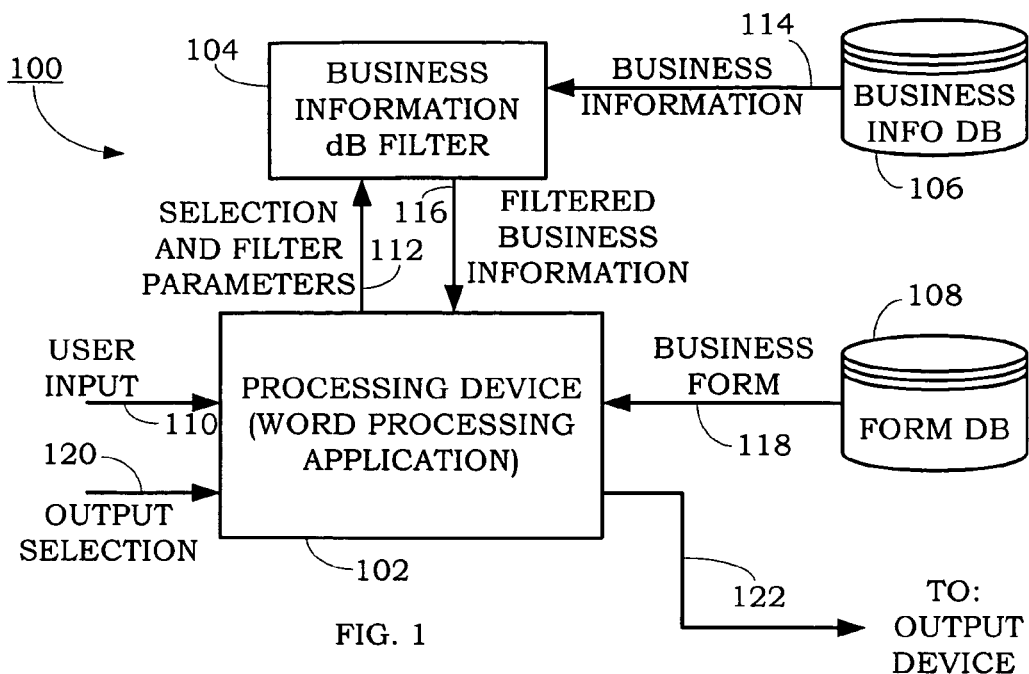
FIG. 1 illustrates a block diagram of one embodiment of an automatic business correspondence generating apparatus.

The present invention provides for the improved functionality and interactivity of merging data from a database application to a word processing application. Through steps, as described in detail below, the data may be place in a form document, maintaining all formatting. For example, the business information retains all font formatting and any tabular formatting based on the predefined form fields within the business form. Through the integration of data with the word processing application, the form may be automatically populated with data from a data source, while maintaining the predefined formatting from the letter template.

With the direct formatting, the present invention allows for the automatic generation of multiple business correspondences, where the business correspondence is any suitable type of communication to another party including business information. As the information is transferred, the multiple form letters may be readily generated in an efficient fashion as the generation does not require direct user oversight or user re-adjustment of the received data because of the predefined formatting in the letter template. Rather, the data contained in the form letter is consistent with the predefined formatting provided in the letter template.

Furthermore, the present invention improves the usability of both the word processing application and the database application through improved integration of data from both applications. The usability of the database is improved by providing further functionality of the data stored therein. The functionality of the word processing application is improved by the added functionality of using the data directly from the database.

Another advantage allows for a greater level of user adaptability. Through the word processing application, customized templates may be generated. The templates may then be used by the software application with the merging of data from the database, to create form letters, including mass mailings, as well as individualized customer-specific letters. In this customized template, there includes metadata not readily apparent to the end user. The metadata may describe the business context of the data to be populated into the form template. Furthermore, with the metadata describing the data to be included in the template, additional programming operations may be utilized in conjunction with generating the letter, such as adjusting the formatting of the letter, operating search functions for specific types of data, using the information for report or planning information purposes, accessing an underlying database, as well other uses recognized by one having ordinary skill in the art.

In conjunction with the integration of the database formatted data with the word processing formatted template the present invention further provides for direct delivery of the form letter. During a generation phase, activities may be associated with a particular template, upon completion of the form letter generation. For example, a form letter may be designated for delivery using an electronic mail delivery system or a facsimile transmission. In this example, the form may then be directly transmitted to the recipient, further automating the process. Or in another example, if the form letter is designated for mailing using the U.S. Postal system, envelopes may be concurrently generated.

FIG. 1 illustrates a block diagram of an apparatus 100 providing automated generation of a business correspondence. The apparatus 100 includes a processing device 102 executing a word processing application, a business information database filter 104, a business information database 106 and a form database 108.

The processing device 102 may be, but not limited to, a single processor, a plurality of processors, a DSP, a microprocessor, an ASIC, a state machine, or any other implementation capable of processing and executing software. The term processing device should not be construed to refer exclusively to hardware capable of executing software and may implicitly include DSP hardware, ROM for storing software, RAM, and any other volatile or non-volatile storage medium. The business information filter 104 is shown as a separate processing element in FIG. 1. This filter 104 may be executed on a stand-alone processing element or may be combined in functionality with the processing device 102 executing the word processing application. The business information database 106 and the form database 108 may be any suitable memory or storage location operative to store sales information or any other suitable information therein including, but not limited to, a single memory, a plurality of memory locations, shared memory, CD, DVD, ROM, RAM, EEPROM, optical storage, microcode, or any other non-volatile storage capable of storing information.

In one embodiment, the processing device 102 receives a user input 110. In one embodiment, the input 110 is received across any suitable input device, such as but not limited to a keyboard, keypad, touch-screen or a peripheral input component. Based on this input 110, the processing device 102 thereupon provides a selection signal and filter parameter signal 112 to the business information database filter 104.

In response to the selection portion of the signal 112, the business information 114 is retrieved from the business information database 106. Using the filter parameters of the signal 112, specific elements of the business information are excluded. For example, the business information 114 may include all the information for a particular customer, including all previous sales information and the filter parameters may be a date range. Therefore, the filter 104 may filter out all information outside of the date range, such as with a monthly invoice.

The filter 104 thereupon provides filtered business information 116 to the processing device 102. The filter 104 provides the filtered business information 116 within the original formatting found within the database 106. The business information database 106 typically stores data acquired from a separate database application (not shown). That database application utilizes specific formatting consistent with the protocols used by the database application. The population and storage of business information into the business information database 106 is in accordance with any suitable well known business information collection technique using a database accessing software application.

Further in response to the user input 110, the processing device 102 is operative to receive a business form 118 from the form database 108. In one embodiment, the business form 118 may be requested from the form database 108 by the processing device 102. In one embodiment, the form 118 may be provided to the processing device 102 based on the user input 110 into the form database 108.

Within the processing device 102 executing the word processing application, the filtered business information 116 is integrated into the business form 118. The business form 118 is an electronic document having a shell encoding consistent with the parameters of the word processing application, but also containing data fields consistent with the data from the database 106, and with the predefined formatting from the template electronic document. Using the metadata, the electronic document can be programmatically accessed by processes, beyond those provided by the word processor. In one embodiment, a programming operation may be performed in conjunction with the word processor, and provide a view into the data from the database, which can populated into the electronic document.

In one embodiment, the business form 118 includes back-end encoded logic allowing for the dynamic generation of data fields having the business data inserted therein. In one embodiment, the business form may be encoded using a markup language such as XML, or any other suitable encoding.

Regardless of the type of programming logic, the business form is dynamically generated based on the business information to be written therein. In the business information data fields of the business form, the filtered business information is inserted therein. Prior techniques utilized search replace functions and these functions destroyed the original formatting of the business information. The present business form includes programmable logic that dynamically generates the tables based on the number inputs, e.g. column and row information, from the business information database. Therefore, when the form is being generated, the form includes pre-defined word processing formatting associated with the word processing application, such as a standard letterhead, standard introductory paragraphs and standard closing text. In addition, the business information is placed in dynamically generated tables retain the original formatting. Therefore, through the use of data fields for the direct insertion of business information, the formatting of the business information is retained, wherein the data fields allowing for direct insertion are contained within the business forms 118 in the form database 108.

The processing device 102 is operative to also receive an output selection signal 120. The output selection signal 120 may be received from any suitable input device, similar to the user input signal 110. The output selection signal 120 provides an indicator of the selected output source for the business form 118 with the filtered business information 116 stored therein. For example, the output selection signal 120 may indicate a business letter to be shipped via a postal delivery system. Therefore, based on the output selection, the appropriate delivery information is obtained, typically from the business information database. For example, if the output is via mail, an address is found, if the output is via facsimile, a phone number is found, if the output is via an electronic messaging system, a message address is found. The contact information may also be found by accessing a contacts list or any other suitable database.

With the business form 118, the filtered business information 116 and the output selection signal 120, the processing device 102 is operative to generate an output form 122. The output form 122 is converted into proper formatting for the proper delivery, as noted by the output selection signal 120. For example, if the output is via electronic messaging, the output form 122 may be converted into a standardized document for attachment to the message, such as an Acrobat Reader file.

Figure 2:
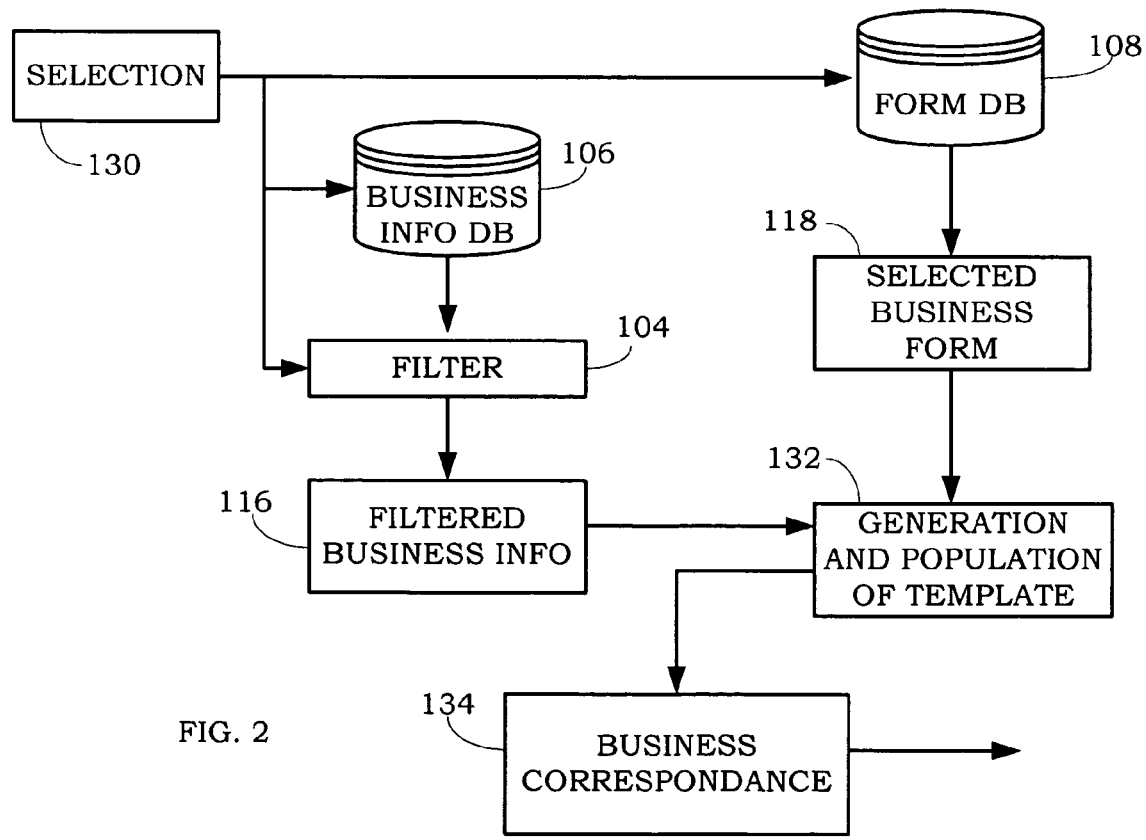
FIG. 2 illustrates a flow diagram of a method for automatically generating a business correspondence.

Upon conversion, the output form 122 is provided to an output device (not shown) for delivery to an end user. The output device may be any suitable output device, such as a printer for printing the business form and an envelope, a facsimile machine for transmitting the form, an electronic message delivery system for transmitting an electronic message, a display screen for providing a visual display of the business form or any other output device as recognized by one having ordinary skill in the art FIG. 2 illustrates a flow diagram of one embodiment of generating business correspondences. The process begins with a selection 130. The selection 130 may be similar to the user input 110 and the output selection 120 of FIG. 1. The selection 130 may be received from any suitable input device and is utilized to access the form database 108 and the business information database 106. In the embodiment described above in FIG. 1, the processing device 102 may perform the database access.

From the form database 108, the selected business form 118 is retrieved. From the business information database 106 the business information 114 is retrieved and applied to the filter 104. The filter parameters may be included within the selection signal 130, as illustrated in FIG. 2, or may be retrieved from any suitable source as recognized by one having ordinary skill in the art. Through the filter 104, the filtered business information 116 is generated and provided to the step 132 populating the template. The template includes the selected business form 118 and may also include other documents for transmission to a user, such as a facsimile cover page, an envelope, or any other suitable documentation.

The next step 132 is the generation of business information data fields based on the business information. As discussed above, in one embodiment, the fields are generated based on the quantity parameters of the business information. For example, if a particular segment of business information is formatted in a table having 4 columns and 8 rows of information, a corresponding table is generated in the document having 4 columns and 8 rows of business information data fields for the insertion of business information therein. Thereupon, the population of the template, also shown in step 132, using the selected business form, generates the business correspondence. In the step of populating the template, the filtered business information 116 maintains its proper formatting, as described above with respect to FIG. 1. The business correspondence may thereupon be converted into proper formatting for transmission and transmitted to the designated recipient.

Figure 3:
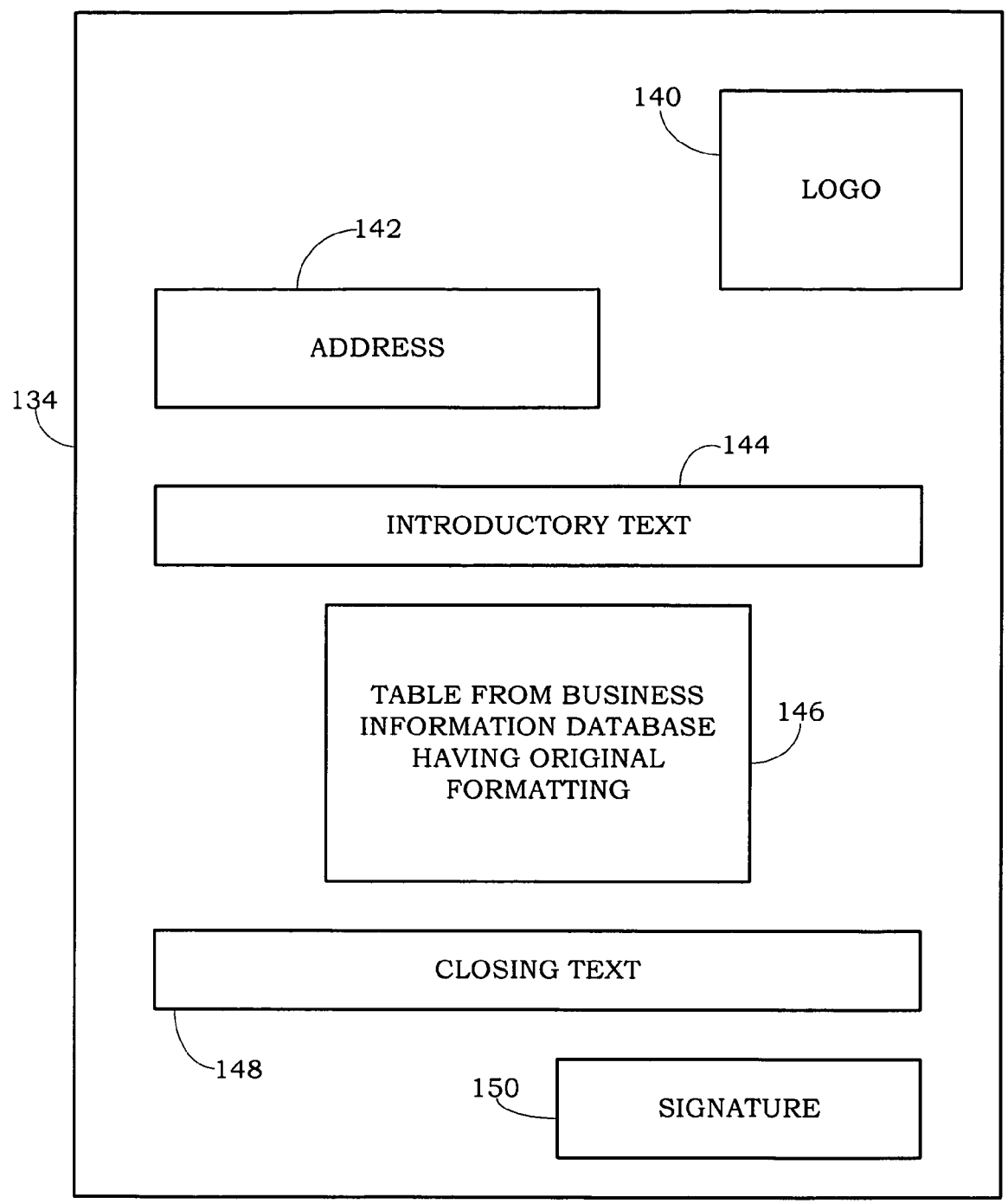
FIG. 3 illustrates a business correspondence in accordance with one embodiment of the present invention.

FIG. 3 illustrates a representative example of a business correspondence 134 in accordance with the present invention. The business correspondence 134 may be found on a display screen, a printout, a electronic message, such as an attachment, a facsimile or any other medium for providing information to an intended addressee.

The correspondence 134 includes a logo 140, address information 142, introductory text 144, a table 146 from the business information database having text in the original formatting, closing text 148 and a signature line 150. In this correspondence 134, the template may include the logo 140, the text 144 and 148 and the signature 150. Through integrating data from the business information database, the address 142 and the table 146 may be inserted into the document 134.

For example, if the correspondence 134 is a monthly billing statement, the business information extracted from the database pertains to the customer and monthly fees. The address field 142 maintains specific formatting, such as symbols are other creative features for the addressee. For example, if a customer has a stylistic name, stylized designs previously were lost by replacing the text into a template, whereas the current business correspondence 134 maintains specific fields coded in the business information database encoding. Merging the coding of the word processing application for background fields (e.g. logo 140, text 144 and 148 and the signature 150) with business information database coding for business information fields (e.g. address 142 and table 146) maintains the formatting of the business information in the word processing document. In other words, the address field 142 may be treated as a single business information data field generated by the logical programming associated with the encoding of the document, therefore the field 142 is generated when the document 134 is generated and the address information is populated within the field maintaining the original database formatting.

In the table 146, the associated business information is retrieved from the business information database. The information may be filtered by, in the above-noted example, dates regarding the billing month. Therefore, only the usage details for a particular month are provided and inserted into the correspondence 134. Similar to the address 142, using business information encoding within the word processing template allows the maintenance of table formatting of the business information.

Figure 4:
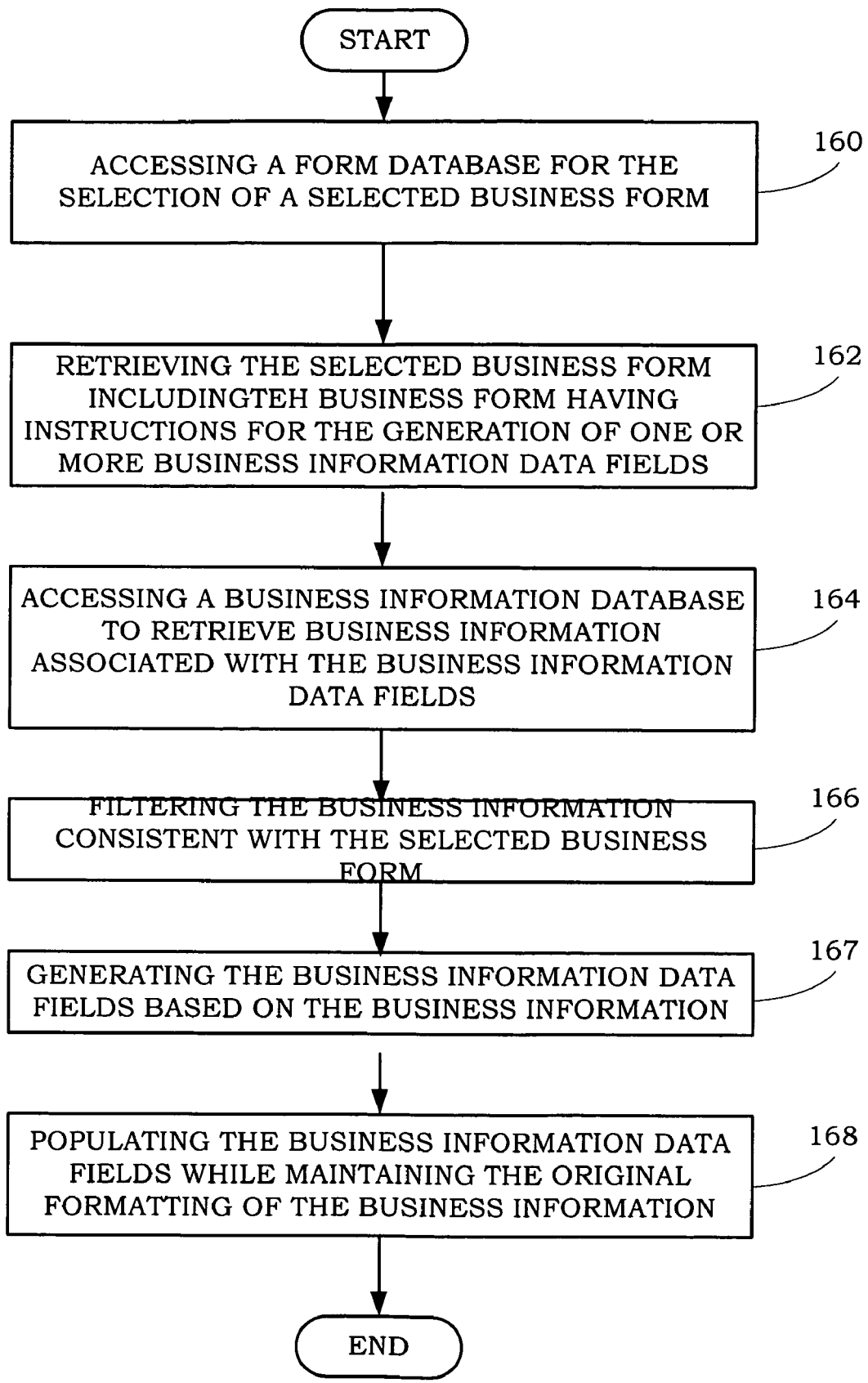
FIG. 4 illustrates a flowchart of the steps of a method for automatically generating a business diagram.

FIG. 4 illustrates the steps of a flowchart of an exemplary method for generating a business correspondence. The method begins, step 160, by accessing a form database for the selection of a selected business form. In one embodiment, selection may be performed through accessing a pull down menu option within a word processing application. The selection of a menu option provides an interactive display screen allowing a user to select one of multiple business form templates, where the templates are stored in the form database (such as database 108 of FIGS. 1 and 2).

The next step, step 162, is retrieving the selected business information form, where the business form includes instructions for the generation of one or more business information data fields. Upon selection of the form, the selected business form is retrieved from the database and loaded into the word processing application. The selected business form includes encoding consistent with the word processing application and instructions capable of being read and executed by the word processing application. The business information database encoding is typically consistent with encoding used by a database access software application used to store business information in the business information database.

The next step, step 164, is accessing a business information database to retrieve business information associated with the business information data fields. In one embodiment, business information is retrieved based on a particular customer or account. Through the word processing application, an end user is able to retrieve the business information in response to a prompt or other data retrieval technique. In another embodiment, based on the selected business form, a group of customer accounts may be accessed, such as generating a mass distribution of correspondences, such as monthly invoices.

Once the business information database is accessed and the business information is retrieved, the next step, step 166, is filtering the business information consistent with the selected business form. Where the business information includes a large amount of information for particular customers, only the specific information for the correspondence is needed. Using the example of a monthly invoice, this filtering step may include filtering out all charges that do not occur within the billing time interval. The filtering of the information is performed based on the parameters defined for the business correspondence and the associated requirements for the particular fields, such as a table field 146 and address field 142 of FIG. 3.

The next step, step 167, is generating the business information data fields in response to the business information. As discussed above, if the business information designated a particular number of data fields, such as with the dimensions of a table, the encoding in the form document allows for the automatic generation of the table having the appropriate number of fields. In one embodiment, the business information data may simply provide inputs regarding the number of business information data fields and the programmable logic dynamically generates the corresponding table.

The next step, step 168, is populating the business information data fields while maintaining the original formatting of the business information. As noted above, the prior techniques utilized search and replace features which destroyed all formatting. Through the combination of encoding for the word processing application and the encoding for the business information database, the inclusion of the filtered business information in the selected business form maintains the business information formatting. Thereupon, one method of automated generation of a business correspondence is complete.

Figure 5:
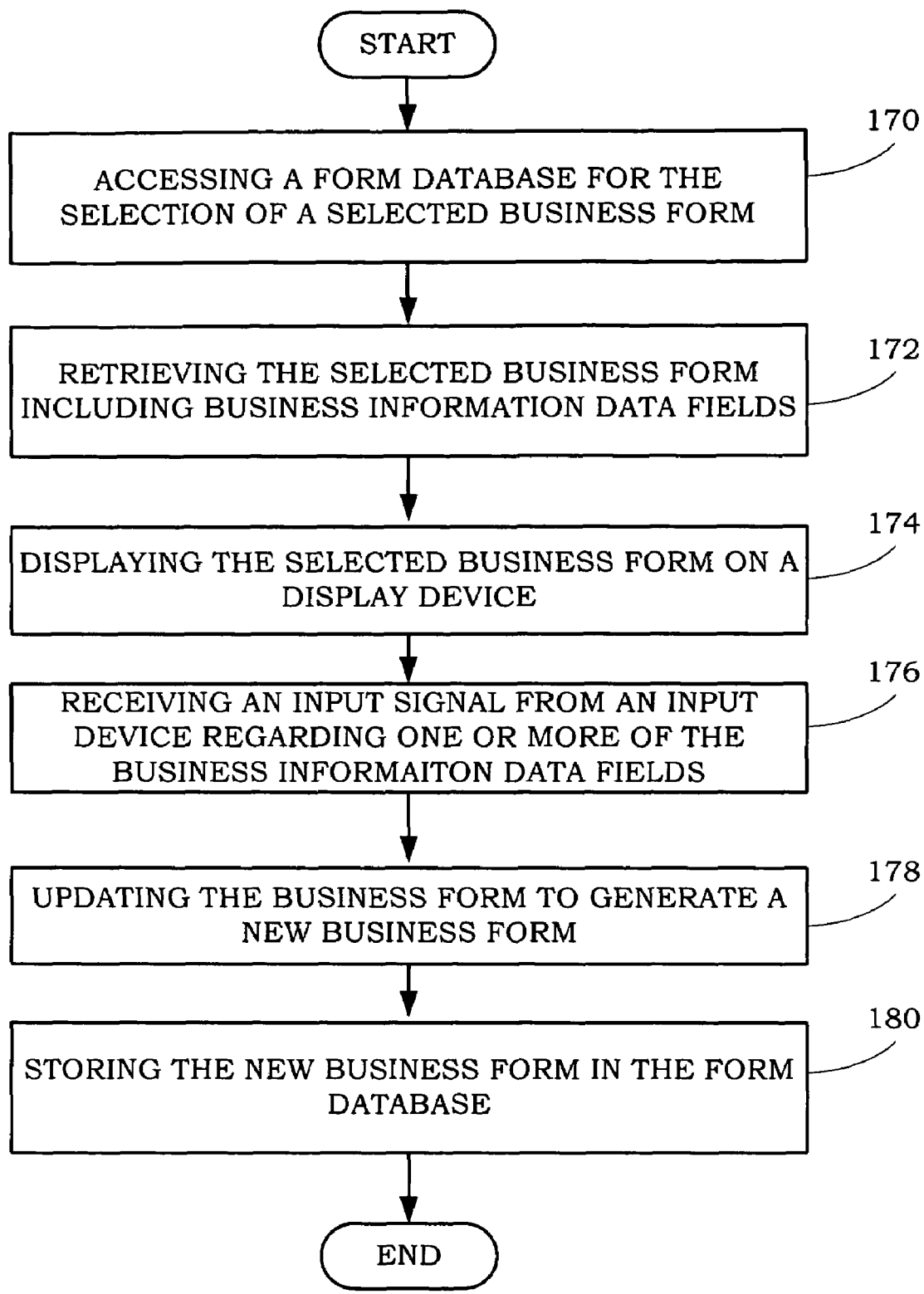
FIG. 5 illustrates a flowchart of the steps of a method for updating a business form template.

FIG. 5 illustrates the steps of a method for generating a business form. The method begins, step 170, by accessing a form database for the selection of a selected business form. The database access may be through the word processing application, such as through a pull-down menu within the word processing application. As recognized by one having ordinary skill in the art, any other suitable technique may be utilized to access the form database, such as a graphical user interface or a direct link to the database.

The next step, step 172, is retrieving the selected business form including the business information data fields. This step may be performed similar to step 162 of FIG. 4 as described above. The next step, step 174, is displaying the selected business form on a display device. A typical display device is a monitor operative in response to display commands from a processing device operating the word processor application.

The next step, step 176, is receiving input signals from an input device regarding one or more of the business information data fields. As discussed above, the input device may be any suitable device providing input commands to a processing device, such as the processing device executing the word processing application. The input signals may include typed input commands from a keyboard or keypad, cursor movement commands from a peripheral device or any other suitable input commands as recognized by one having ordinary skill in the art.

The input signals may be commands to add, remove or adjust the business information data fields. Other fields may be similarly adjusted, such as word processing application fields. For example, if a customer requests bimonthly billing instead of monthly billing, the business form may be appropriately adjusted. Using the example of the correspondence 134 of FIG. 3, the table 146 may be adjusted to include filter parameters for two months instead of the previous one-month interval. The introductory text 144 and the closing text 148 may be adjusted to reflect the bimonthly billing status. In this step, once again the data fields associated with business information from the business information database is formatted consistent with the business information database formatting and the fields associated with the word processing application are formatted consistent with the word processing application.

Once the business form has been adjusted, the next step, step 178, is updating the business form to generate a new business form. This step may be completed by creating a completely separate form or may utilize a versioning technique to indicate the new form as a particular version of the general form. The next step, step 180, is storing the new business form in the database. This step may also be completed through the word processing application accessing the form database. As such, the new business form may be used by other applications accessing the form database. Thereupon, this embodiment of the method of generating a business form is complete.

Therefore, through maintaining proper formatting of business information, automated business correspondences can be generated. The business information may be extracted from an outside source, such as the business information database. The business information within the business information database is formatted for use by a database accessing software application. Through the dual encoding of the business forms, the business information may be added to the forms while maintaining the original formatting. As such, the business correspondence technique may be automated, eliminating the requirement for a user to reformat the business information, improving the speed of generating multiple business correspondences properly merging word processing business forms and database formatted business information.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exists implementations of other variations and modifications of the invention and its various aspects, as may be readily apparent to those of ordinary skill in the art, and that the invention is not limited by specific embodiments described herein. For example, the filtering operation may also be performed prior to data extraction from the business information database, such as only requesting specific information using a standard search feature or operation. It is therefore contemplated to cover any and all modifications, variations or equivalents that fall within the scope of the basic underlying principals disclosed and claimed herein.

What is claimed is:

1. An apparatus for automated generation of a business correspondence from formatted business information using forms, comprising:

a business information database having business information stored therein in an original format;

a form database having a plurality of business forms stored therein, select business forms including business information insertion fields which include retrieval instructions for retrieving business information for the respective field and formatting instructions for generating formatting for a word processing program to accommodate the original format of the retrieved business information; and a processing device in operative communication with the form database and the business information database, the processing device operative to execute executable instructions such that the processor, in response to the executable instructions:

accesses a form database for the selection of a selected business form from a plurality of business forms stored therein;

retrieves the selected business form;

opens a new document in the word processing program using the selected business form as a template;

for each field in the business form for which retrieval instructions are provided:

accesses a business information database to retrieve business information associated with the respective business information data fields using the retrieval instructions;

determines size parameters for the retrieved business information;

inserts formatting into the document to fit the retrieved business information in its original format to the respective business information data field based on the business information, the size parameters and the formatting instructions, and populates the respective business information data field while maintaining the original formatting of the business information as stored in the business information database.

2. The apparatus of claim 1 wherein the processing device, in response to executable instructions:

generates an output form including the business information disposed within the business information data fields.

3. The apparatus of claim 2 further comprising:

an output device; and the processing device, in response to executable instructions:

converts the output form to be provided to the output device.

4. The apparatus of claim 3 wherein the output device includes at least one of:

a printer, a messaging device, an electronic mail delivery system and a facsimile machine.

5. The apparatus of claim 1, the processing device operative to perform the executable instructions in conjunction with the word processing application such that the step of accessing the form database is through the word processing application.

6. The apparatus of claim 1, further comprising an input device in operative communication with the processing device such that the processing device is operative to receive an input signal from the input device; and a display device in operative communication with the processing device, the display device operative to receive a display signal including the selected business form and associated business information data fields.

7. The apparatus of claim 6, the processing device in response to the executable instructions is further operative to:

query a user regarding the business information data fields; and update the business information data fields in response thereto.

8. The apparatus of claim 6, the processing device in response to the executable instructions is further operative to:

query a user regarding the selected business form;

update the selected business form in response thereto to generate a new business form; and storing the new business form in the form database.

9. An automated business correspondence generation method from formatted business information using forms comprising accessing a form database for the selection of a selected business form from a plurality of business forms stored therein;

retrieving the selected business form, select business forms including business information insertion fields which include retrieval instructions for retrieving business information for the field and formatting instructions for generating formatting for a word processing program to accommodate the original format of the retrieved business information;

opening a new document in the word processing program using the selected business form as a template;

for each field in the business form for which retrieval instructions are provided:

accessing a business information database to retrieve business information associated with the respective business information data fields using the retrieval instructions, determining size parameters for the retrieved business information;

inserting the formatting into the word processing program to accommodate the retrieved business information in its original format for the respective business information data field based on the business information, the size parameters and the formatting instructions, and populating the respective business information data field while maintaining the original formatting of the business information as stored in the business information database.

10. The method of claim 9 wherein the business information data fields include instructions that can be executed by a word processor to generate formatting to accommodate the business information as stored in the business information database.

11. The method of claim 9 further comprising:

generating an output form including the business information disposed within the business information data fields.

12. The method of claim 11 further comprising:

converting the output form to be provided to an output device.

13. The method of claim 12 wherein the output device includes at least one of:

a printer, a messaging device, an electronic mail delivery system and a facsimile machine.

14. The method of claim 9, further comprising providing a display signal to a display device, wherein the display signal includes the selected business form and associated business information data fields.

15. The method of claim 14 further comprising:

querying a user regarding the business information data fields; and updating the business information data fields in response thereto.

16. The method of claim 9 wherein the business information data fields include instructions that can be executed by a word processor to generate formatting to accommodate the format of the business information as stored in the business information database.

* * * * *